Nov. 27, 1934. R. S. TROTT 1,982,593
ENGINE MOUNTING
Filed March 16, 1932
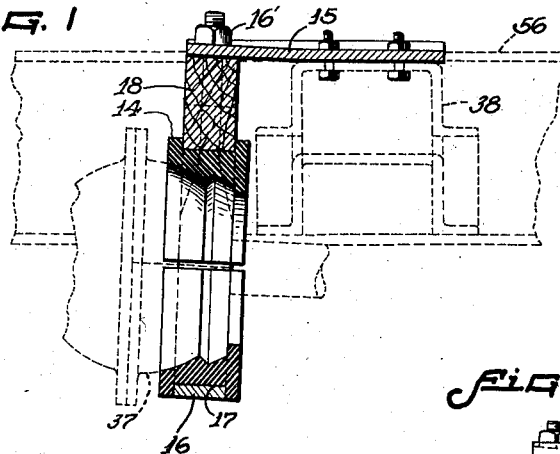
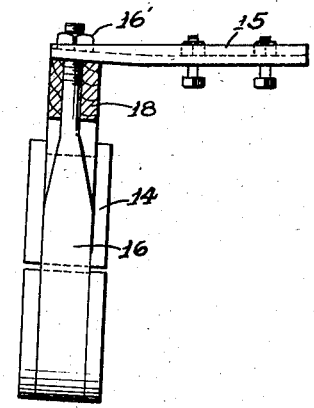
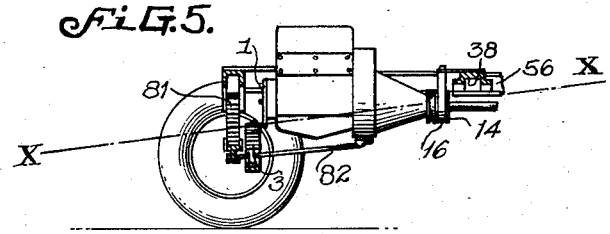
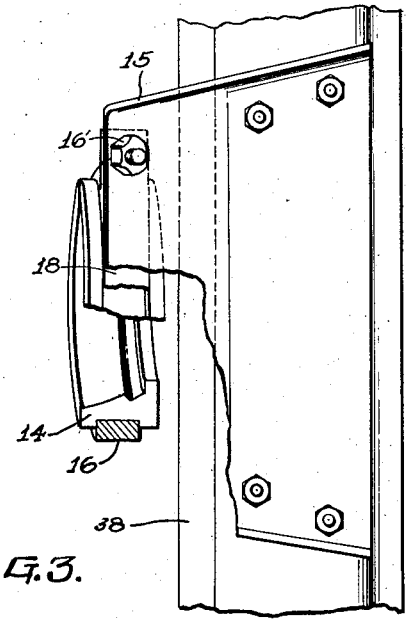
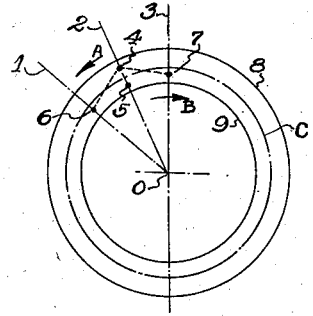

Patented Nov. 27, 1934

1,982,593

UNITED STATES PATENT OFFICE 1,982,593

ENGINE MOUNTING

Rolland S. Trott, Denver, Colo.

Original application November 25, 1929, Serial No. 409,572 (abandoned). Divided and this application March 26, 1932, Serial No. 599,249

8 Claims. (Cl. 248—14.2)

My invention relates to engine mountings for automotive vehicles and is a division of my application for Letters Patent on Engine mountings which was filed November 25th, 1929, the Serial Number being 409,572.

The object of the present invention is to provide an engine mounting by which the engine unit may be mounted upon the frame to provide a cushioned substantially pivotal movement and by a cheap and reliable construction.

A further object is to provide such an engine mounting of rubber or other cushioning or non-metallic material which will both resiliently carry engine weight and provide resiliently opposed substantially pivotal movement between the engine unit and the frame of the vehicle.

A further object is to provide such a non-metallic weight-carrying and torque-transmitting mounting in which the torque-transmitting ability may be varied.

I attain the above objects by providing a substantially pivotal mounting for the engine unit preferably including a rubber member molded to conform to the contours of the universal joint housing or other external member attached to the engine unit, and also molded to fit support means carried by the frame and supporting an end of the engine unit through the rubber member.

These constructions are fully described below and are illustrated in the drawing in which:—

Figure 1 is a section of one form of the mounting construction with some of the co-acting parts of the vehicle shown in dotted lines.

Figure 2 is a side elevation and partial section of Figure 1 without the co-acting parts of the vehicle.

Figure 3 is a top elevation and partial section of the mounting shown in Figure 1 and showing a part of the co-acting cross member of the frame.

Figure 4 is a diagram to illustrate the different kinds of deformation sustained by the rubber member.

Figure 5 is a side elevation, partly in section, showing the application of the invention to an engine unit.

I have shown in Figure 5 the manner of supporting an engine unit in a vehicle, as set forth in my above-mentioned application Ser. No. 409,572. The engine unit is supported at its front end by means of a bracket 1 carried on a transversely extending leaf-spring 3 which in turn is supported by the front axle of the vehicle or by a radius rod 82 carried by the front axle. The front ends of the side members 56 are also carried on the front axle by a leaf-spring 81. The rear end portion of the engine unit is supported by a mounting member 14 which is carried by a cross frame member 28 and which member extends between and is supported by the side frame members 56.

The rubber member 14 is composed, in the form shown, of two substantially half-circular separated pieces, and is molded to fit the outer contour of an external part which may be a part of or attached to the rear of the transmission case such as the universal joint housing 37, which is shown by dotted lines in Figure 1, but whose horizontal flanges by which the housing is bolted together and whose safety hook are not shown. The two rubber pieces may, of course, if desired, be made integral, or if two pieces are employed their line of division may be horizontal, as shown, or vertical or at any other angle.

If desired the outer contour of the member 14 may be made slightly elliptical with the long axis horizontal so that the rubber member 14 will not be able to revolve in its mounting.

The effect of this mounting seems to be to reduce the free pivotal action provided by the mounting at slow engine speeds without apparently having an effect at the higher speeds, so the natural result is that the mounting reduces the free movement of the engine while it is running idle with the car stationary.

The molding of the rubber to fit the part attached to the transmission or engine unit acts to prevent its movement with respect thereto; and the molding of the rubber to fit the support acts to prevent movement between the rubber and the support.

The support member 15 is properly attached to the cross member 38 of the frame and the strap member 16 fits in the groove 17 of the rubber member 14 and is supported on the support member 15 by the adjusting nuts 16'. The support member 15 is provided with a spacer portion 18 which may be made integral with the member 15 or separate as shown, and this portion 18 fits in the groove 17 of the member 14, which construction assists in holding the spacer portion 18 in place if it be separate from the member 15 as shown. The spacer portion 18 may be made of wood as shown or of any other proper material or construction so long as it acts to position the member 14 with respect to the support member 15.

The depth of the spacer portion 18 of the support member 15 is proportioned so that when the rear of the power plant is at the desired height the strap member 16 pulls the rubber member up against the spacer portion 18, the required compression of the rubber being provided by the proper depth of the spacer portion 18 and the proper adjustment of the nuts 16'.

Thus the mounting acts to properly support and position the power plant upon the frame against vertical, horizontal, axial or mixed forces and the resilience of the rubber member 14 permits the necessary slight pivotal or oscillating and cushioning radial or mixed movements of the power plant with respect to the frame. The fit of the rubber member 14 upon the part which it supports and its elliptical outer surface which fits the curves of the strap 16 and the spacer portion 18 combine to prevent movement of the rubber member with respect to either engine unit or frame support so that the pivotal or oscillating movement provided by the mounting must come from the action and resilience of the rubber member alone.

The material between two points of the rubber member which are on or near the same radial line will be in a shear; while the material between two points of the rubber member which are on two angularly separated radial lines will be in either tension or compression.

This is illustrated in Figure 4 in which the circles 8 and 9 represent the outer and the inner surfaces respectively of the rubber member and the dotted circle passes through the neutral points between the circles 8 and 9. The material between the points 4 and 5 on the radial line 0—2 will be in shear when the surfaces 8 and 9 have relative movement in the directions shown by the arrows A and B respectively.

At the same time the material between the points 4 and 6 will be in compression and the material between the points 4 and 7 will be in tension. Should the arrows A and B represent relative rectilinear movement square with the radial line 0—2 the same conditions of shear, compression and tension will occur.

And all of the above explanation will apply equally well in whatever direction from the center 0 the radial line 0—2 extends.

At low engine speeds, with a four-cylinder engine especially, the torque impulses are separated and the tendency is for the engine unit to oscillate through a greater number of degrees than is the case at higher engine speeds when the time element between the separated impulses is less and the inertia effect of the engine unit becomes correspondingly greater. In other words, this mounting not only provides cushioned vertical, horizontal, axial or mixed movement by action of the rubber of the member 14, but due to the immobility of the inner face of the rubber member with respect to the part it contacts and of the outer face of the rubber member with respect to the frame support construction the rubber member acts to resiliently cushion the torque impulses of the engine unit and to limit the oscillating or pivotal movements which the torque impulses tend to produce.

The resilient resistance to this pivotal or oscillating movement by the action of the rubber member may be greatly varied by adjustment of the nuts 16'; in fact these nuts may be screwed down and the rubber of the member 14 compressed to such an extent as to so reduce the pivotal movement as well as the radial movements permitted by the member 14 that the engine forces are transmitted to the frame to such an extent as to eliminate the entire object of the mounting and produce a vibration and a roughness in the vehicle that is very disturbing.

Therefore the nuts 16' should be adjusted to diminish the compression on the rubber of the member 14 to a point where the disturbing transmission of force and torque reactions to the frame will be sufficiently reduced. The amount of torque which can be properly taken care of by this mounting will naturally depend upon the size of the mounting and the width, thickness and consistency of the rubber material employed for the member 14 as well as upon the compression to which the material of the member 14 is subjected by the adjustment of the nut 16'.

I am well aware that various modifications which will still produce practical results are possible for this mounting. Therefore I do not wish to limit my protection narrowly to the exact construction proportions or position of the one form of mounting shown and described but what I claim as new and desire to protect by Letters Patent is as follows:—

1. In a motor vehicle, the combination with a frame, and an engine unit having a universal joint housing at an end thereof, of a cushioning member embracing said housing and constructed to fit the contacting surface thereof for supporting the end portion of the engine unit through the housing, and means carried by the frame for supporting the cushioning member.

2. In a motor vehicle, the combination with an engine unit having an approximately spherical engine unit portion at an end thereof and projecting longitudinally from said end approximately in the longitudinal central vertical plane of the engine unit, of a non-metallic resilient member surrounding said spherical portion in a direction transversely of the engine unit and having the inner surface thereof curved to fit the approximately spherical engine unit portion and to support said portion, and means for preventing relative turning movement between the contacting surfaces of the supported portion and the resilient member, the turning movement of the engine unit being permitted by the flow of the resilient material.

3. An engine mounting comprising a non-metallic resilient member having the inner surface thereof curved to fit a portion of a spherical universal joint housing and to support said portion, means for preventing relative turning movement between the contacting surfaces of the supported portion and the resilient member, and means supporting the resilient member and having provision in the contact surfaces thereof to hold said surfaces against relative turning movement.

4. An engine mounting comprising a non-metallic annular resilient member to engage and support an engine unit portion, a block having a concave under side bearing against the periphery of said resilient member, a U-shaped clamp extending about the under side of said resilient member and a portion of the block and provided with threaded ends, and means for drawing up on the threaded ends of the clamp for applying pressure on opposite sides of the resilient member between the clamp and block.

5. An engine mounting comprising a non-metallic resilient member to engage and support an engine unit portion, a supporting plate, a block arranged between said plate and the resilient member, a U-shaped clamp extending about the under side of said resilient member and the block and through the plate, and nuts on the ends of the U-shaped clamp for applying pressure on opposite sides of the resilient member between the clamp and the block.

6. In a motor vehicle, the combination with an engine unit having an approximately spherical universal joint housing, of a non-metallic cushioning member embracing said housing and having its inner surface shaped to fit the contacting surface thereof, and supporting said universal joint housing, and means carried by the vehicle for supporting the cushioning member.

7. In a motor vehicle, the combination with an engine unit having an approximately spherical universal joint housing, of a non-metallic cushioning member embracing said housing and having its inner surface shaped to fit the contacting surface thereof, and supporting said universal joint housing, and means carried by the vehicle for supporting the cushioning member and for clamping said member to the housing so as to permit turning of the housing only by the flow of the resilient material.

8. An engine mounting comprising a non-metallic annular resilient member adapted to engage and support an engine unit portion, a block having a concave under surface bearing against the periphery of said resilient member, a U-shaped clamp extending about the under side of said resilient member and a portion of the block, and means for drawing up on the clamp for apply pressure on opposite sides of the resilient member between the clamp and block.

ROLLAND S. TROTT.